United States Patent
Kim et al.

(10) Patent No.: US 10,713,445 B2
(45) Date of Patent: Jul. 14, 2020

(54) METHOD FOR PROVIDING TRANSLATION SERVICE, AND ELECTRONIC DEVICE THEREFOR

(71) Applicant: SAMSUNG ELECTRONICS CO., LTD., Suwon-si (KR)

(72) Inventors: Hak-Jung Kim, Goyang-si (KR); Seung-Wook Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/780,139

(22) PCT Filed: Nov. 29, 2016

(86) PCT No.: PCT/KR2016/013890
§ 371 (c)(1),
(2) Date: May 30, 2018

(87) PCT Pub. No.: WO2017/095113
PCT Pub. Date: Jun. 8, 2017

(65) Prior Publication Data
US 2018/0357223 A1 Dec. 13, 2018

(30) Foreign Application Priority Data

Nov. 30, 2015 (KR) .................. 10-2015-0169221

(51) Int. Cl.
*G06F 40/58* (2020.01)
*G06F 16/00* (2019.01)
(Continued)

(52) U.S. Cl.
CPC ............ *G06F 40/58* (2020.01); *G06F 16/00* (2019.01); *G06F 40/279* (2020.01); *G06F 40/47* (2020.01)

(58) Field of Classification Search
None
See application file for complete search history.

(56) References Cited

U.S. PATENT DOCUMENTS

| 8,326,598 B1 | 12/2012 | Macherey et al. |
| 2006/0217960 A1 | 9/2006 | Kato et al. |

(Continued)

FOREIGN PATENT DOCUMENTS

| JP | 2006-276919 A | 10/2006 |
| JP | 2010-33418 A | 2/2010 |

(Continued)

OTHER PUBLICATIONS

International Search Report dated Feb. 27, 2017, issued by the International Searching Authority in counterpart International Patent Application No. PCT/KR2016/013890 (PCT/ISA/210).

*Primary Examiner* — Antim G Shah
(74) *Attorney, Agent, or Firm* — Sughrue Mion, PLLC

(57) ABSTRACT

According to one embodiment of the present invention, a method for providing a translation service by using an electronic device can comprise the steps of: receiving an original text written in a first language; displaying the original text in a first area on a display; generating a translation created by translating the original text into a second language; extracting a keyword from the translation; displaying the translation in a second area on the display; and displaying content related to the keyword in a third area on the display if the keyword is selected from the translation. In addition, other examples are also possible.

10 Claims, 15 Drawing Sheets

(51) Int. Cl.
*G06F 40/47* (2020.01)
*G06F 40/279* (2020.01)

(56) References Cited

U.S. PATENT DOCUMENTS

| | | | |
|---|---|---|---|
| 2008/0300859 A1* | 12/2008 | Chen | G06F 9/543 |
| | | | 704/7 |
| 2009/0125477 A1* | 5/2009 | Lu | G06F 16/3343 |
| 2009/0132233 A1* | 5/2009 | Etzioni | G06F 17/28 |
| | | | 704/3 |
| 2010/0004918 A1 | 1/2010 | Lee et al. | |
| 2012/0271828 A1* | 10/2012 | Raghunath | G06F 16/3337 |
| | | | 707/739 |
| 2013/0166275 A1 | 6/2013 | Yang et al. | |
| 2015/0088651 A1* | 3/2015 | Geiger | G06Q 30/02 |
| | | | 705/14.54 |
| 2015/0205788 A1 | 7/2015 | Kadotani et al. | |
| 2015/0286634 A1* | 10/2015 | Shin | G06F 17/2785 |
| | | | 704/2 |
| 2015/0310290 A1* | 10/2015 | Cuthbert | G06F 17/289 |
| | | | 382/182 |

FOREIGN PATENT DOCUMENTS

| | | |
|---|---|---|
| KR | 10-2010-0004652 A | 1/2010 |
| KR | 10-2010-0055156 A | 5/2010 |
| KR | 10-2001-0097802 A | 11/2011 |
| KR | 10-2012-0094562 A | 8/2012 |
| KR | 10-2013-0071958 A | 7/2013 |
| KR | 10-2015-0116675 A | 10/2015 |

\* cited by examiner

METHOD FOR PROVIDING TRANSLATION SERVICE, AND ELECTRONIC DEVICE THEREFOR

CROSS-REFERENCE TO RELATED APPLICATION(S)

This application is a National Phase Entry of PCT International Application No. PCT/KR2016/013890, which was filed on Nov. 29, 2016, and claims priority to Korean Patent Application No. 10-2015-0169221, which was filed on Nov. 30, 2015, the contents of which are incorporated herein by reference.

BACKGROUND

1. Field

The present disclosure relates to an electronic device for providing a translation service.

2. Description of the Related Art

The advent of a language translator has eased the need to make the effort of referring to a dictionary in order to find out the meaning of words or text written in a foreign language. A generally used language translator may be integrated with a computer system, a mobile device, or an electronic dictionary, or may be provided in the form of an online service via a website.

SUMMARY

When a user inputs a word or a sentence that needs to be translated into the interface of a language translator, the language translator may translate the word and the sentence into another language and may output a translation. The translated word or sentence may be information that a user is interested in or some other matter of interest. Currently, a language translator mechanically translates only words or sentences into other languages, and outputs translations, but does not consider a matter of interest to a user which requires translation.

An aspect of the present disclosure is to provide a translation method and an electronic device therefor, which is capable of providing a translation and an additional service in consideration of a matter of interest to the user who requires the corresponding translation.

A method for providing a translation service at an electronic device according to an embodiment of the present disclosure may include: receiving original text written in a first language; displaying the original text in a first area of a display of the electronic device; generating a translation created by translating the original text into a second language; extracting a keyword from the translation; displaying the translation in a second area of the display; and if the keyword is selected in the translation, displaying content related to the keyword in a third area of the display.

A method for providing a translation service at an electronic device according to another embodiment of the present disclosure may include: executing a first application of which a language is set to a first language; selecting original text, which is written in a second language and is displayed on a display of the electronic device; receiving the original text written in the second language via a character input window of a first application screen; and displaying, in the character input window, a translation created by translating the original text written in the second language into the first language.

An electronic device for providing a translation service according to an embodiment of the present disclosure may include: an input/output interface configured to receive original text written in a first language; a display configured to display the original text in a first area; and a processor configured to: generate a translation by translating the original text into a second language, extract a keyword from the translation, control the display to display the translation in a second area; and when the keyword is selected from the translation, control the display to display content related to the keyword in a third area.

A storage medium stores instructions according to an embodiment of the present disclosure, and the instructions are configured to enable at least one processor to perform at least one operation when the instructions are executed by at least one processor, the at least one operation including: receiving original text written in a first language; displaying the original text in a first area of a display of the electronic device; generating a translation created by translating the original text into a second language; extracting a keyword from the translation; displaying the translation in a second area of the display; and if the keyword is selected in the translation, displaying content related to the keyword in a third area of the display.

According to the present disclosure, there is provided a translation method and an electronic device therefor, which is capable of providing a translation and an additional service in consideration of a matter of interest to a user which requires the corresponding translation.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
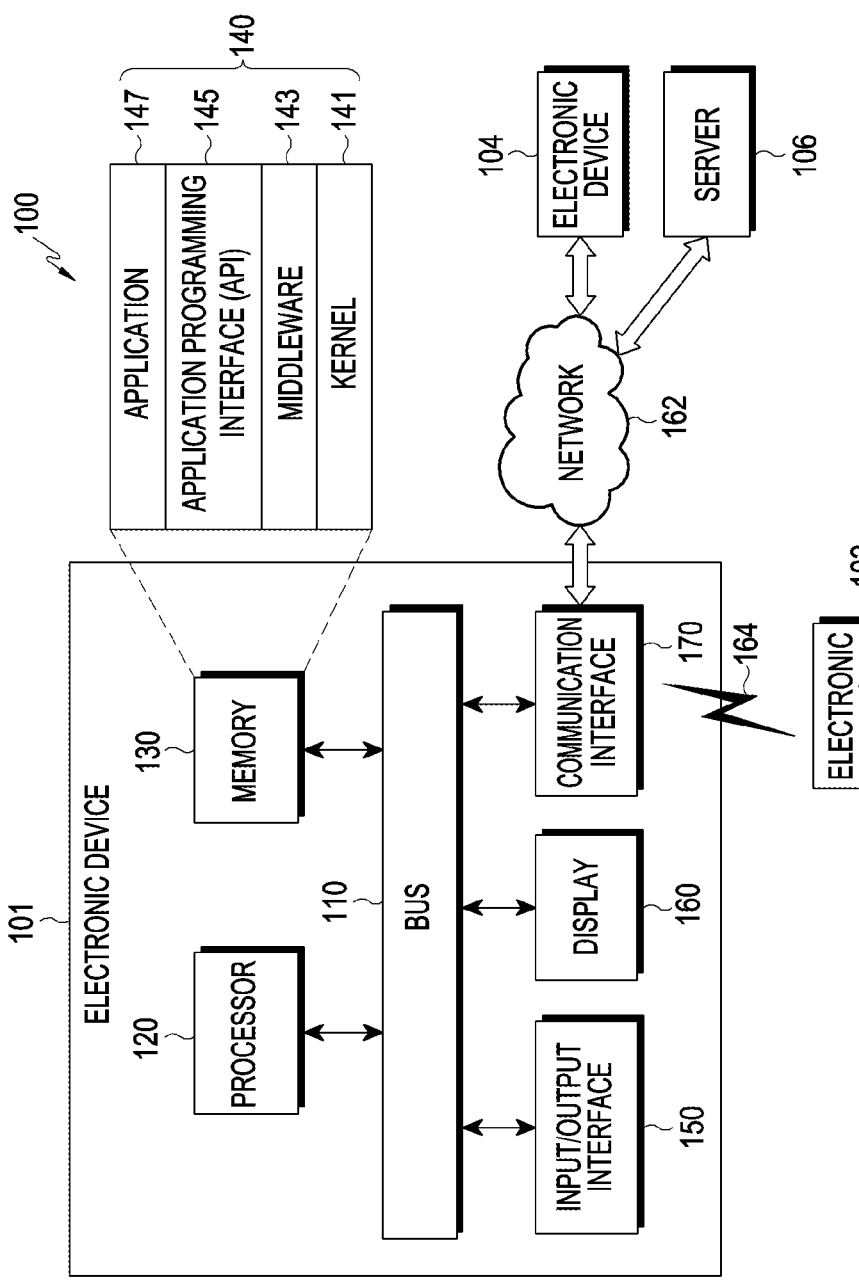
FIG. 1 is a diagram illustrating a network environment including an electronic device according to various embodiments.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

In the present disclosure, the expression "have", "may have", "include" or "may include" refers to existence of a corresponding feature (e.g., numerical value, function, operation, or components such as elements), and does not exclude existence of additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

When it is mentioned that one element (e.g., a first element) is "(operatively or communicatively) coupled with/to or connected to" another element (e.g., a second element), it should be construed that the one element is directly connected to the another element or the one element is indirectly connected to the another element via yet another element (e.g., a third element). Conversely, when one component element is "directly coupled" or "directly connected" to another component element, it may be construed that a third component element does not exist between the first component element and the second component element.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

FIG. 1 illustrates a network environment including an electronic device according to various embodiments of the present disclosure. Referring to FIG. 1, an electronic device 101 in a network environment 100 according to various embodiments of the present disclosure is illustrated.

The electronic device 101 may include a bus 110, a processor 120, a memory 130, an input/output interface 150, a display 160, and a communication interface 170. In some embodiments, the electronic device 101 may omit at least one of the above elements, or may additionally include other elements.

The bus 110 may include, for example, a circuit for connecting the elements 120 to 170 and transferring communication (e.g., control messages and/or data) between the elements.

The processor 120 may include one or more of a Central Processing Unit (CPU), an Application Processor (AP), and a Communication Processor (CP). The processor 120 may carry out, for example, operations or data processing relating to control and/or communication of one or more other elements of the electronic device 101.

According to an embodiment, the processor 120 may perform a translation function. When original text written in a first language is inputted, the processor 120 may generate a translation created by translating the original text into a second language. The processor 120 may control the display 160 such that the translation is displayed.

According to an embodiment, the processor 120 may extract one or more keywords from the original text or the translation. For example, when it is assumed that the original text or the translation is "travel to London", the processor 120 may extract "London", "travel", or the like as keywords from the original text or the translation. When the keyword is extracted, the processor 120 may determine content related to the keyword. For example, the processor 120 may determine, for example, a travel bureau advertisement, a travel bureau website, a portal search result, a travel image, or the like as content related to the keyword "travel". Also, when the keyword is selected in the original text or the translation, the processor 120 may display the content related to the keyword. In this instance, the processor 120 may control the display 160 such that the original text, the translation, and the content related the keyword are displayed in different respective areas.

The memory 130 may include volatile and/or nonvolatile memory. The memory 130 may store, for example, commands or data relevant to at least one other element of the electronic device 101. According to an embodiment, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130) used for executing an operation or function implemented by other programs (e.g., the middleware 143, the API 145, or the application 147). Furthermore, the kernel 141 may provide an interface via which the middleware 143 or the API 145, or the application programs 147 may access the individual elements of the electronic device 101 to control or manage system resources.

The middleware 143 may function as, for example, an intermediary for allowing the API 145 or the application programs 147 to communicate with the kernel 141 to exchange data.

Furthermore, the middleware 143 may process one or more task requests received from the application programs 147 according to the priorities thereof. For example, the middleware 143 may assign priorities to use the system resources (e.g., the bus 110, the processor 120, the memory 130, or the like) of the electronic device 101, to at least one of the application programs 147. For example, the middleware 143 may perform scheduling or load balancing on the one or more task requests by processing the one or more task requests according to the priorities assigned to the one or more application programs.

The API 145 is an interface via which the applications 147 control functions provided from the kernel 141 or the middleware 143, and may include, for example, at least one interface or function (e.g., instruction) for file control, window control, image processing, or text control.

The input/output interface 150 may function as, for example, an interface that may transfer commands or data input from a user or another external device to the other element(s) of the electronic device 101. Also, the input/output interface 150 may output commands or data received from other element(s) of the electronic device 101 to the user or another external device. According to an embodiment, the input/output interface 150 may receive original text written in a first language from a user.

The display 160 may include, for example, a Liquid Crystal Display (LCD), a Light-Emitting Diode (LED) display, an Organic-Light Emitting Diode (OLED) display, a Micro Electro Mechanical System (MEMS) display, or an electronic paper display. The display 160 may display, for example, various types of contents (e.g., text, images, videos, icons, or symbols) to the user. The display 160 may include a touch screen and may receive, for example, a touch input, a gesture input, a proximity input, or a hovering input using an electronic pen or the user's body part. According to an embodiment, the display 160 may display the original text written in the first language, which is input via the input/output interface 150, or may display a translation created by translating the original text into a second language. The display 160 may display content related to a keyword included in the translation, according to the control of the processor 120.

The communication interface 170 may set, for example, communication between the electronic device 101 and an external device (e.g., a first external electronic device 102, a second external electronic device 104, or a server 106). For example, the communication interface 170 may be connected to a network 162 via wireless or wired communication to communicate with the external device (e.g., the second external electronic device 104 or the server 106). According to an embodiment, the communication interface 170 may receive content related to the keyword from external electronic devices 102 and 104 or the server 106 according to the control of the processor 120.

The wireless communication may use at least one of, for example, Long-Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. Furthermore, the wireless communication may include, for example, short-range communication 164. The short-range communication 164 may include at least one of, for example, Wi-Fi, Bluetooth, Nearfield Communication (NFC), Global Navigation Satellite System (GNSS), etc. The GNSS may include, for example, at least one of a Global Positioning System (GPS), a Global Navigation Satellite System (GLONASS), a BeiDou Navigation Satellite System (hereinafter, referred to as "BeiDou"), and Galileo (the European global satellite-based navigation system) according to the place of usage or bandwidth thereof. Hereinafter, in this document, the term "GPS" may be interchangeable with the term "GNSS". The wired communication may include, for example, at least one of a Universal Serial Bus (USB), a High Definition Multimedia Interface (HDMI), Recommended Standard 232 (RS-232), a Plain Old Telephone Service (POTS), and the like. The network 162 may include a telecommunication network, for example, at least one of a computer network (e.g., a LAN or a WAN), the Internet, and a telephone network.

Each of the first and second external electronic devices 102 and 104 may be of a type the same as, or different from, that of the electronic device 101. According to an embodiment, the server 106 may include a group of one or more servers. According to various embodiments, all or some of operations performed by the electronic device 101 may be performed by another electronic device or a plurality of electronic devices (e.g., the electronic devices 102 and 104, or the server 106). According to an embodiment, when the electronic device 101 has to perform some functions or services automatically or in response to a request, the electronic device 101 may make a request for performing at least some functions relating thereto to another device (e.g., the electronic device 102 or 104 or the server 106) instead of, or in addition to, performing the functions or services by itself. Another electronic device may execute the requested functions or the additional functions, and may deliver the result of execution thereof to the electronic device 101. The electronic device 101 may provide the received result as it is, or may additionally process the received result and provide the requested functions or services. To achieve this, for example, cloud computing, distributed computing, or client-server computing technology may be used.

According to an embodiment, the server 106 may perform the same functions as those of the electronic device 101, for example, a translation function, a function of extracting a keyword from original text written in a first language or a translation written in a second language, a function of providing content related to the keyword to the electronic device 101 that requires translation, and the like. According to an embodiment, the electronic device 101 requests translation from the server 106, and the server 106 may translate a word or a sentence transmitted (input) by the electronic device 101, that is, original text written in the first language, into the second language in real time. For example, the electronic device 101 accesses a webpage that provides a translation function via the server 106, and inputs a word or a sentence written in the first language into an interface of the corresponding webpage, thereby requesting translation from the sever 106. The server 106 may translate the word or the sentence, which is input by the electronic device 101 via the webpage, into the second language in real time, and may output the same via the webpage, thereby providing a translation function to the electronic device 101.

According to an embodiment, the server 106 may extract one or more keywords from the original text written in the first language or the translation written in the second language, like the processor 120 of the electronic device 101. When the keyword is extracted, the server 106 may determine content related to the keyword. The server 106 may output the content related to the keyword together with the translation to the electronic device 101. The server 106 may determine a service provider which is capable of providing the content. The server 106 may receive the content related to the keyword from the service provider and may transmit the same to the electronic device 101. Also, the server 106 may request the service provider to provide the content related to the keyword to the electronic device 101. The service provider may provide the content related to the keyword to the electronic device 101 in response to a request from the server 106.

An electronic device for providing a translation service according to an embodiment of the present disclosure may include: an input/output interface configured to receive original text written in a first language; a display configured to display the original text in a first area; and a processor configured to: generate a translation by translating the original text into a second language, extract a keyword from the translation, control the display to display the translation in a second area; and when the keyword is selected from the translation, control the display to display content related to the keyword in a third area.

Figure 2:
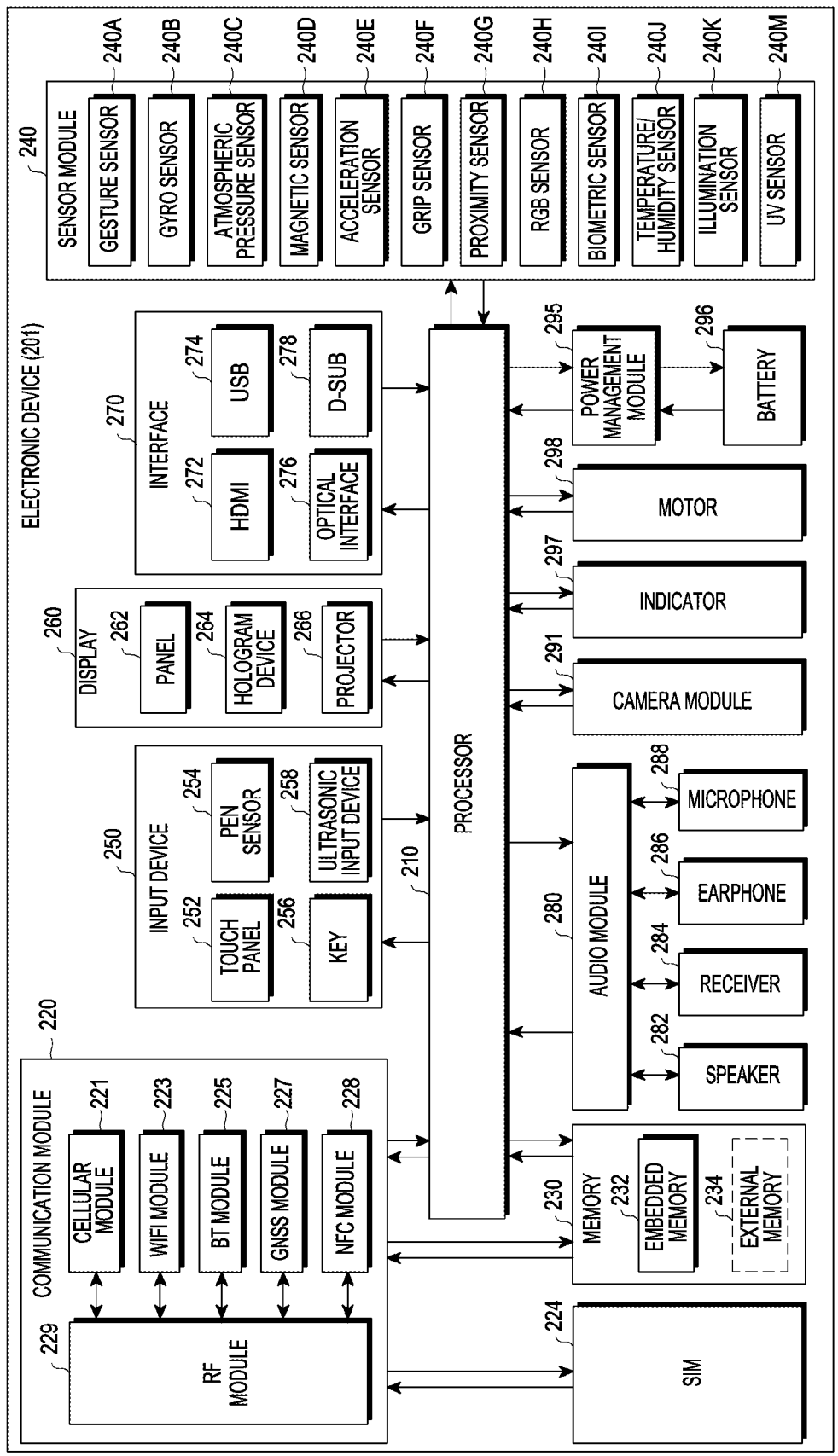
FIG. 2 is a block diagram of an electronic device that provides a translation service according to various embodiments.

FIG. 2 is a block diagram of an electronic device according to various embodiments.

The electronic device 201 may include, for example, the whole or a part of the electronic device 101 illustrated in FIG. 1. The electronic device 201 may include at least one processor (e.g., an Application Processor (AP)) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

The processor 210 may control multiple hardware or software elements connected to the processor 210 by running, for example, an Operation System (OS) or an application, and may perform various data processing and operations. The processor 210 may be implemented as, for example, a System on Chip (SoC). According to an embodiment, the processor 210 may further include a Graphic Processing Unit (GPU) and/or an image signal processor. The processor 210 may also include at least some (e.g., a cellular module 221) of the elements illustrated in FIG. 2. The processor 210 may load commands or data received from at least one (e.g., a nonvolatile memory) of the other elements into a volatile memory, process the loaded commands or data, and store various data in a nonvolatile memory.

The communication module 220 may have a configuration identical to or similar to that of the communication interface 170 of FIG. 1. The communication module 220 may include, for example, a cellular module 221, a Wi-Fi module 223, a Bluetooth module 225, a GNSS module 227 (e.g., a GPS module, a GLONASS module, a BeiDou module, or a Galileo module), an NFC module 228, and a Radio Frequency (RF) module 229.

The cellular module 221 may provide, for example, a voice call, a video call, a text message service, an Internet service, or the like via a communication network. According to an embodiment, the cellular module 221 may identify and authenticate the electronic device 201 within a communication network using the subscriber identification module 224 (e.g., a SIM card). According to an embodiment, the cellular module 221 may perform at least some of the functions that the processor 210 may provide. According to an embodiment, the cellular module 221 may include a Communication Processor (CP).

For example, each of the Wi-Fi module 223, the BT module 225, the GNSS module 227, and the NFC module 228 may include a processor for processing data transmitted/received via the corresponding module. According to some embodiments, at least some (e.g., two or more) of the cellular module 221, the Wi-Fi module 223, the BT module 225, the GNSS module 227, and the NFC module 228 may be included in a single Integrated Chip (IC) or IC package.

The RF module 229 may transmit/receive, for example, a communication signal (e.g., an RF signal). The RF module 229 may include, for example, a transceiver, a Power Amplifier Module (PAM), a frequency filter, a Low-Noise Amplifier (LNA), an antenna, and the like. According to another embodiment, at least one of the cellular module 221, the Wi-Fi module 223, the BT module 225, the GNSS module 227, and the NFC module 228 may transmit/receive an RF signal via a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 or an external memory 234. The embedded memory 232 may include, for example, at least one of a volatile memory (e.g., a Dynamic Random Access Memory (DRAM), a Static RAM (SRAM), a Synchronous Dynamic RAM (SDRAM), or the like) and a nonvolatile memory (e.g., a One-time Programmable ROM (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory, a NOR flash memory, or the like), a hard disc drive, a Solid State Drive (SSD), or the like).

The external memory 234 may further include a flash drive, for example, a Compact Flash (CF), a Secure Digital (SD), a Micro-Secure Digital (Micro-SD), a Mini-Secure Digital (Mini-SD), an extreme Digital (xD), a Multi-Media Card (MMC), a memory stick, or the like. The external memory 234 may be functionally and/or physically connected to the electronic device 201 via any of various interfaces.

The sensor module 240 may, for example, measure a physical quantity or detect the operating state of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illumination sensor 240K, and an ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments, the electronic device 201 may further include a processor, which is configured to control the sensor module 240, as a part of the processor 210 or separately from the processor 210 in order to control the sensor module 240 while the processor 210 is in a sleep state.

The input device 250 may include, for example, a touch panel 252, a (digital) pen sensor 254, a key 256, or an ultrasonic input device 258. The touch panel 252 may be, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user.

The (digital) pen sensor 254 may include, for example, a recognition sheet which is a part of the touch panel or is separate from the touch panel. The key 256 may include, for example, a physical button, an optical key, or a keypad. The ultrasonic input device 258 may detect ultrasonic waves, which are generated by an input tool, using a microphone (e.g., a microphone 288), and may identify data corresponding to the detected ultrasonic waves.

The display 260 (e.g., the display 160) may include a panel 262, a hologram device 264, or a projector 266. The panel 262 may have a configuration that is the same as, or similar to, that of the display 160 illustrated in FIG. 1. The panel 262 may be implemented to be, for example, flexible, transparent, or wearable. The panel 262, together with the touch panel 252, may be implemented as one module. The hologram device 264 may show a three-dimensional image in the air using light interference. The projector 266 may display an image by projecting light onto a screen. The screen may be located, for example, in the interior of, or on the exterior of, the electronic device 201. According to one embodiment, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-sub-miniature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

For example, the audio module 280 may bidirectionally convert between a sound and an electrical signal. At least some elements of the audio module 280 may be included, for example, in the input/output interface 150 illustrated in FIG. 1. The audio module 280 may process sound information that is input or output via, for example, a speaker 282, a receiver 284, earphones 286, the microphone 288, and the like.

The camera module 291 is a device that can photograph a still image and a video. According to an embodiment, the camera module 291 may include one or more image sensors (e.g., a front sensor or a rear sensor), a lens, an Image Signal Processor (ISP), or a flash (e.g., an LED, a xenon lamp, or the like).

The power management module 295 may manage, for example, the power of the electronic device 201. According to an embodiment, the power management module 295 may include a Power Management Integrated Circuit (PMIC), a charger Integrated Circuit (IC), or a battery or fuel gauge. The PMIC may use a wired and/or wireless charging method. The wireless charging method may include, for example, a magnetic resonance method, a magnetic induction method, an electromagnetic wave method, and the like. Additional circuits (e.g., a coil loop, a resonance circuit, a rectifier, and the like) for wireless charging may be further included. The battery gauge may measure, for example, the amount of charge remaining in the battery 296 and a voltage, current, or temperature while charging. The battery 296 may include, for example, a rechargeable battery and/or a solar battery.

The indicator 297 may display a particular state, for example, a booting state, a message state, a charging state, or the like of the electronic device 201 or a part (e.g., the processor 210) of the electronic device 201. The motor 298 may convert an electrical signal into a mechanical vibration and may generate a vibration, a haptic effect, or the like. Although not illustrated, the electronic device 201 may include a processing unit (e.g., a GPU) for supporting mobile TV. The processing unit for supporting the mobile TV may process media data according to a standard such as Digital Multimedia Broadcasting (DMB), Digital Video Broadcasting (DVB), MediaFlo™, or the like.

Each of the above-described component elements of hardware according to the present disclosure may be configured with one or more components, and the names of the corresponding component elements may vary based on the type of electronic device. In various embodiments of the present disclosure, the electronic device may include at least one of the above-described elements, and may exclude some of the elements or further include other additional elements. Further, some of the components of the electronic device according to the various embodiments of the present disclosure may be combined to form a single entity, and thus, may equivalently execute functions of the corresponding elements prior to the combination.

Figure 3:
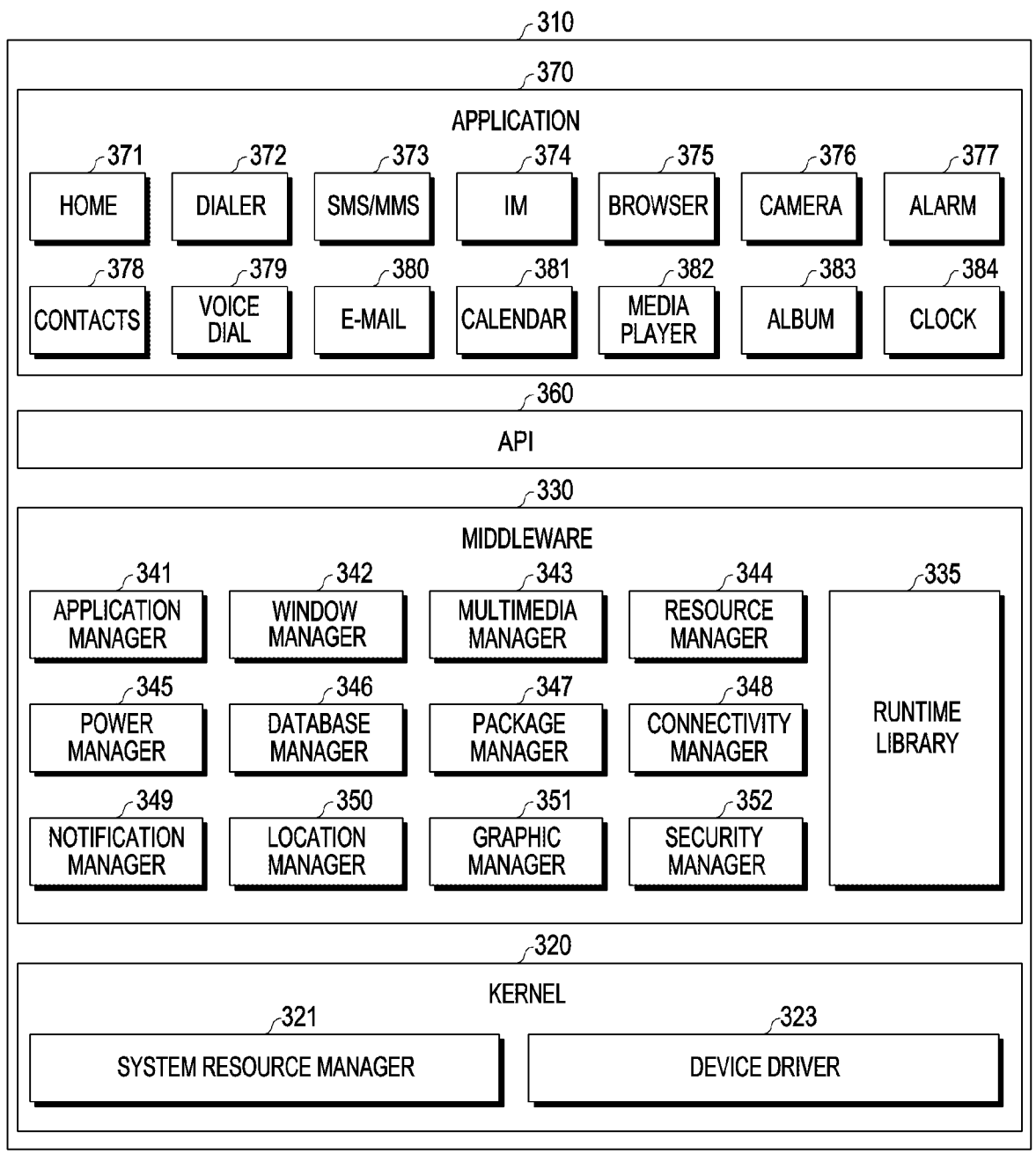
FIG. 3 is a block diagram of a program module according to various embodiments.

FIG. 3 is a block diagram of a program module according to various embodiments.

According to an embodiment, the program module 310 (e.g., the program 140) may include an Operating System (OS) for controlling resources related to an electronic device (e.g., the electronic device 101) and/or various applications (e.g., the application programs 147) executed in the operating system. The operating system may be, for example, Android, iOS, Windows, Symbian, Tizen, Bada, or the like.

The program module 310 may include a kernel 320, middleware 330, an Application Programming Interface (API) 360, and/or an application 370. At least some of the program module 310 may be preloaded on the electronic device, or may be downloaded from an external electronic device (e.g., the electronic device 102 or 104 or the server 106).

The kernel 320 (e.g., the kernel 141) may include, for example, a system resource manager 321 and/or a device driver 323. The system resource manager 321 may control, allocate, or retrieve system resources. According to an embodiment, the system resource manager 321 may include a process manager, a memory manager, a file system manager, or the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide, for example, a function required by the applications 370 in common, or may provide various functions to the applications 370 via the API 360 so that the applications 370 can efficiently use the limited system resources within the electronic device. According to an embodiment, the middleware 330 (e.g., the middleware 143) may include at least one of, for example, a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function using a programming language while the applications 370 are being executed. The runtime library 335 may perform functions that are related to the management of input and output, the management of memory, arithmetic functions, or the like.

The application manager 341 may, for example, manage a life cycle of at least one of the applications 370. The window manager 342 may manage GUI resources used for a screen. The multimedia manager 343 may determine formats required for reproducing various media files and may encode or decode a media file using a coder/decoder (codec) appropriate for a corresponding format. The resource manager 344 may manage resources, such as the source code, the memory, the storage space, and the like of at least one of the applications 370.

For example, the power manager 345 may operate together with a Basic Input/Output System (BIOS) or the like, and may manage a battery or power, and may provide power information and the like required for operation of the electronic device. The database manager 346 may generate, search, or change a database to be used by at least one of the applications 370. The package manager 347 may manage the installation or update of an application that is distributed in the form of a package file.

The connectivity manager 348 may manage a wireless connection, such as Wi-Fi, Bluetooth, and the like. The notification manager 349 may display or provide notification of an event, such as an arrival message, an appointment, a proximity notification, and the like, in such a manner as not to disturb a user. The location manager 350 may manage the location information of the electronic device. The graphic manager 351 may manage a graphic effect to be provided to a user and a user interface relating to the graphic effect. The security manager 352 may provide various security functions required for system security, user authentication, and the like. According to an embodiment, in the case where the electronic device (e.g., the electronic device 101) has a telephone call function, the middleware 330 may further include a telephony manager for managing a voice or video call function of the electronic device.

The middleware 330 may include a middleware module that forms a combination of various functions of the above-described elements. The middleware 330 may provide modules that are specialized according to the types of operating systems in order to provide differentiated functions. Furthermore, the middleware 330 may dynamically remove some of existing elements, or may add new elements.

The API 360 (e.g., the API 145) is a set of API programming functions, and may be provided in a different configuration depending on the operating system. For example, in the case of Android or iOS, one API set may be provided for each platform, and in the case of Tizen, two or more API sets may be provided for each platform.

The applications 370 (e.g., the application programs 147) may include, for example, one or more applications that can perform functions, such as home 371, a dialer 372, SMS/MMS 373, Instant Messaging (IM) 374, a browser 375, a camera 376, an alarm 377, contacts 378, voice dialer 379, e-mail 380, a calendar 381, a media player 382, a photo album 383, a clock 384, or applications for providing health care (e.g., measure exercise quantity or blood sugar) or environmental information (e.g., atmospheric pressure, humidity, temperature information or the like).

According to an embodiment, the applications 370 may include an application (hereinafter, referred to as an "information exchange application" for convenience of description) supporting information exchange between the electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may include a function of delivering, to an external electronic device (e.g., the electronic device 102 or 104), notification information generated by other applications (e.g., an SMS/MMS application, an email application, a health care application, an environmental information application, and the like) of the electronic device. Furthermore, the notification relay application may, for example, receive notification information from the external electronic device and may provide the received notification information to a user.

The device management application may manage (e.g., install, delete, or update), for example, at least one function of an external electronic device (e.g., the electronic device 102 or 104) communicating with the electronic device (e.g., a function of turning on/off the external electronic device itself (or some elements) or a function of adjusting luminance (or a resolution) of the display), applications operating in the external electronic device, or services provided by the external electronic device (e.g., a call service and a message service).

According to an embodiment, the applications 370 may include applications (e.g., a health care application of a mobile medical appliance or the like) designated according to the attributes of an external electronic device (e.g., the electronic device 102 or 104). According to an embodiment, the applications 370 may include an application received from an external electronic device (e.g., the server 106 or the electronic device 102 or 104). According to an embodiment, the applications 370 may include preloaded applications or third-party applications that can be downloaded from a server. The names of the elements of the program module 310, according to the above-described embodiment, may vary depending on the type of operating system.

According to various embodiments, at least a part of the program module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, modules, programs, routines, sets of instructions, processes, or the like for performing one or more functions.

A storage medium stores instructions according to an embodiment of the present disclosure, and the instructions are configured to enable at least one processor to perform at least one operation when the instructions are executed by at least one processor, the at least one operation including: receiving original text written in a first language; displaying the original text in a first area of a display of the electronic device; generating a translation created by translating the original text into a second language; extracting a keyword from the translation; displaying the translation in a second area of the display; and if the keyword is selected in the translation, displaying content related to the keyword in a third area of the display.

Figure 4:
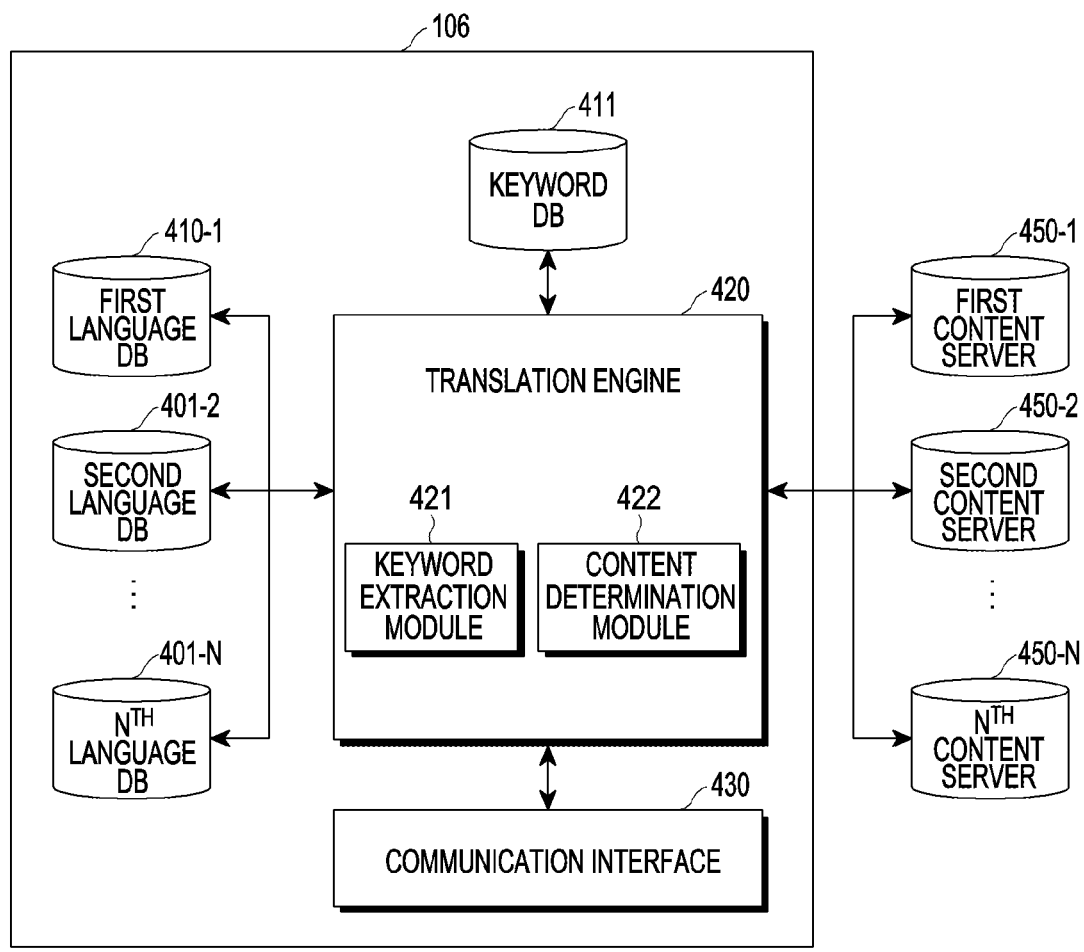
FIG. 4 is a block diagram of a server that provides a translation service according to various embodiments.

FIG. 4 is a block diagram of a server that provides a translation service according to various embodiments.

Referring to FIG. 4, the server 106 may include at least one from among first to $N^{th}$ language DBs 410-1, 410-2, . . . , and 410-N, a translation engine 420, and a communication interface 430.

The first to $N^{th}$ language DBs 410-1, 410-2, . . . , and 410-N may store words or idioms of different nations, descriptions (definitions) thereof, and the like. The first to $N^{th}$ language DBs 410-1, 410-2, . . . , and 410-N may be updated based on a predetermined period.

The translation engine 420 may translate original text written in a first language, which is received from the electronic device 101 via the communication interface 430, into a translation written in a second language. The translation engine 420 may translate the original text written in the first language into the second language in consideration of the grammar of each of the first language and the second language. Also, the translation engine 420 may determine, as a translation of the original text, the translation candidate that has the smallest number of grammatical errors or the translation candidate that is selected by one or more users the largest number of times from among translation candidates created by translating the original text, written in the first language, into the second language.

The translation engine 420 may be implemented in a form including a keyword extraction module 421 and a content determination module 422. The keyword extraction module 421 may extract one or more words or idioms included in original text or a translation. For example, when it is assumed that original text or a translation is "where is Gyeongbokgung?", the keyword extraction module 421 of the translation engine 420 may extract "Gyeongbokgung" as a keyword from the sentence.

According to an embodiment, the keyword extraction module 421 may extract a keyword from original text or a translation by referring to a keyword DB 411 included in the server 106. The keyword DB 411 may store words that may be used as keywords, and the keyword DB 411 may be updated based on a translation every time the translation engine 420 translates original text. According to an embodiment, the translation engine 420 may check how frequently a keyword is extracted as a keyword for each keyword. For example, if the word "apple" is extracted as a keyword more frequently than the word "orange", the translation engine 420 may extract the keyword "apple" first from a translation including both "apple" and "orange". Also, the translation engine 420 may control the electronic device 101 such that content related to "apple" is more preferentially displayed than content related to "orange".

The content determination module 422 may determine content related to a keyword extracted by the keyword extraction module 421. The keyword in the above-described sentence is "Gyeongbokgung". The content determination module 422 may determine a map showing the location of Gyeongbokgung, a picture of Gyeongbokgung, events held at Gyeongbokgung, a homepage including various information associated with Gyeongbokgung, or the like, as content corresponding to the keyword "Gyeongbokgung". When the content related to the keyword is determined, the translation engine 420 may provide the content related to the keyword to the electronic device 101. According to an embodiment, when the content related to the keyword is determined, the translation engine 420 may transmit the corresponding content to the electronic device 101 via the communication interface 430. As described above, when the keyword is "Gyeongbokgung", the translation engine 420 may transmit a link of the homepage address of Gyeongbokgung, a picture of Gyeongbokgung, a map showing the location of Gyeongbokgung, and the like to the electronic device 101.

According to an embodiment, the server 106 may be connected to one or more servers, that is, first to $N^{th}$ content servers 450-1, 450-2, ..., and 450-N, which provide the content via the communication interface 430. For example, at least one of the first to $N^{th}$ content servers 450-1, 450-2, ..., and 450-N may be a web/news DB. The web/news DB may store one or more news items. The server 106 may search for a web/news item corresponding to a keyword from the web/news DB. According to an embodiment, the web/news DB may periodically update a web/news item using an automatic collector (e.g., a news crawler, a web collector, or the like).

For example, at least one of the first to $N^{th}$ content servers 450-1, 450-2, ..., and 450-N may be a Korean advertisement DB. The Korean advertisement DB may store one or more advertisements written in Korean. The server 106 may search for a Korean advertisement corresponding to a keyword from the Korean advertisement DB. For example, at least one of the first to $N^{th}$ content servers 450-1, 450-2, ..., and 450-N may be a foreign language (e.g., English) advertisement DB. The foreign language advertisement DB may store one or more advertisements written in a foreign language. The server 106 may search for a foreign language advertisement corresponding to a keyword from the foreign language advertisement DB.

According to an embodiment, all operations performed by the translation engine 420 included in the server 106 of FIG. 4 may be performed by the processor 120 of the electronic device 101.

Figure 5:
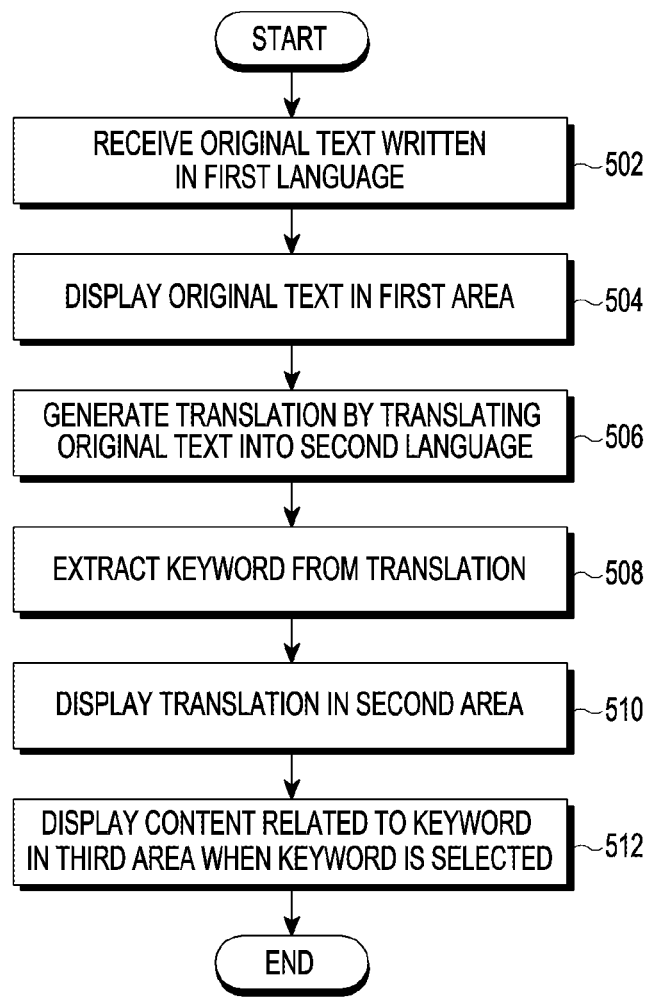
FIG. 5 is a diagram illustrating a method of providing a translation service by an electronic device according to various embodiments.

FIG. 5 is a diagram illustrating a method of providing a translation service by an electronic device according to various embodiments.

Referring to FIG. 5, the electronic device 101 may receive original text written in a first language from a user in operation 502. In operation 504, the electronic device 101 may display the original text in a first area of the display 160, in which at least one object is displayed.

In operation 506, the processor 120 of the electronic device 101 may generate a translation which is created by translating the original text into a second language. In operation 508, the processor 120 may extract a keyword from the translation. According to an embodiment, when the keyword is extracted in operation 508, the processor 120 may determine content related to the keyword.

In operation 510, the electronic device 101 may display the translation in a second area of the display 160. According to an embodiment, the keyword in the translation displayed in operation 510 may be displayed in a manner that distinguishes the same from text that is different from the keyword. For example, the processor 120 may control the display 160 such that text corresponding to the keyword is underlined or such that text corresponding to the keyword is displayed in a different font color or font size. According to an embodiment, the processor 120 may control the display 160 such that text corresponding to the keyword in the original text is displayed in a manner that distinguishes the same from the original text excluding the keyword.

According to an embodiment, the electronic device 101 may receive user input for selecting the keyword. When the keyword is selected, the electronic device 101 may display content related to the keyword in a third area of the display 160 in operation 512. According to an embodiment, the electronic device 101 may receive a drag input of dragging text corresponding to the keyword or a click input of clicking on the text corresponding to the keyword, as a user input for selecting the keyword. When such drag input or click input is received, the processor 120 may determine, as the third area, an area remaining after excluding the first area and the second area from the area of the display 160, and may control the display 160 to display the content in the third area. According to another embodiment, the processor 120 may control the display 160 such that the third area is displayed to overlap the second area where the translation is displayed.

Figure 6:
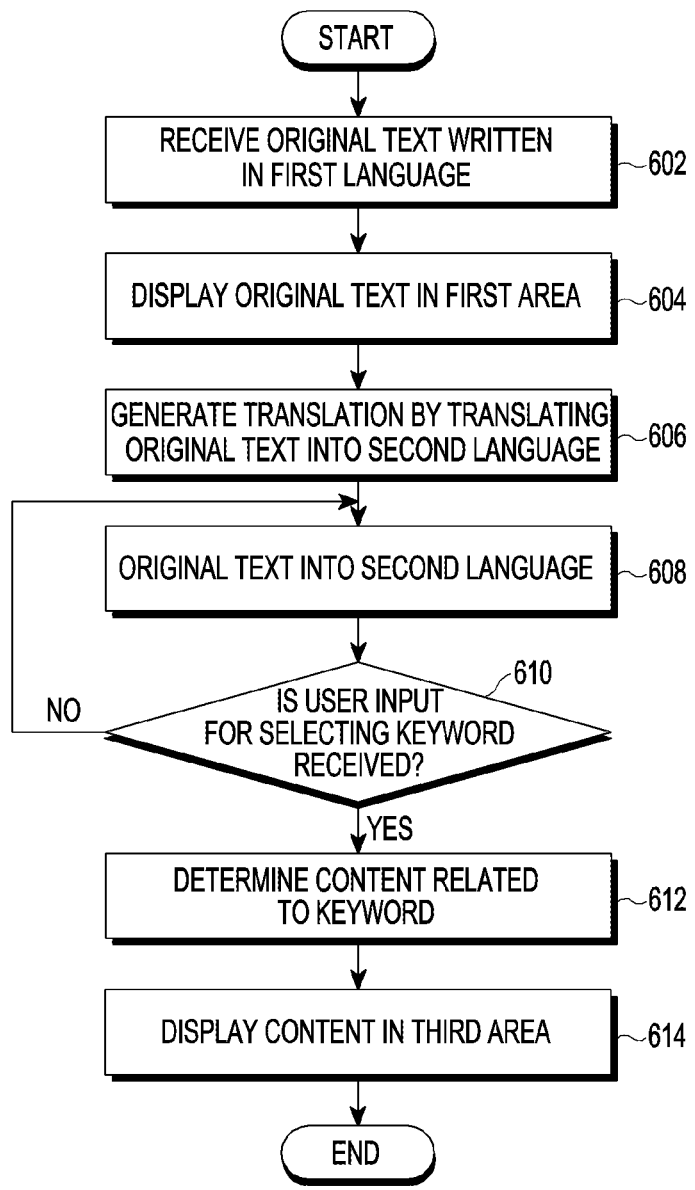
FIG. 6 is a diagram illustrating a method of providing a translation service by an electronic device according to various embodiments.

FIG. 6 is a diagram illustrating a method of providing a translation service by an electronic device according to various embodiments.

Referring to FIG. 6, the electronic device 101 may receive original text written in a first language from a user in operation 602. The processor 120 of the electronic device 101 may display the original text in a first area of the display 160 in operation 604. According to an embodiment, operation 602 and operation 604 may be executed in parallel.

The processor 120 may generate a translation created by translating the original text into a second language in operation 606. In operation 608, the electronic device 101 may display the translation in a second area of the display 160. According to an embodiment, operation 606 and operation 608 may be executed in parallel. For example, when the original text written in the first language is input into the first area, the processor 120 may translate the original text into the second language and may display the translation in the second area in real time.

According to an embodiment, the processor 120 may determine whether user input for selecting a keyword from the translation displayed in the second area is received in operation 610. When the result of the determination in operation 610 shows that no user input for selecting the keyword is received (610: NO), the processor 120 may control the electronic device 101 to maintain the current state of displaying the translation in the second area in operation 608.

When the result of the determination in operation 610 shows that user input for selecting the keyword is received (610: YES), the processor 120 may determine content related to the selected keyword in operation 612. For example, when it is assumed that the keyword selected by the user is "mug", the processor 120 may determine the dictionary definition of "mug", images of a "mug", information associated with a company that sells a "mug", and the like as content related to "mug".

In operation 614, the electronic device 101 may display the content related to the keyword in a third area of the display 160.

Figure 7:
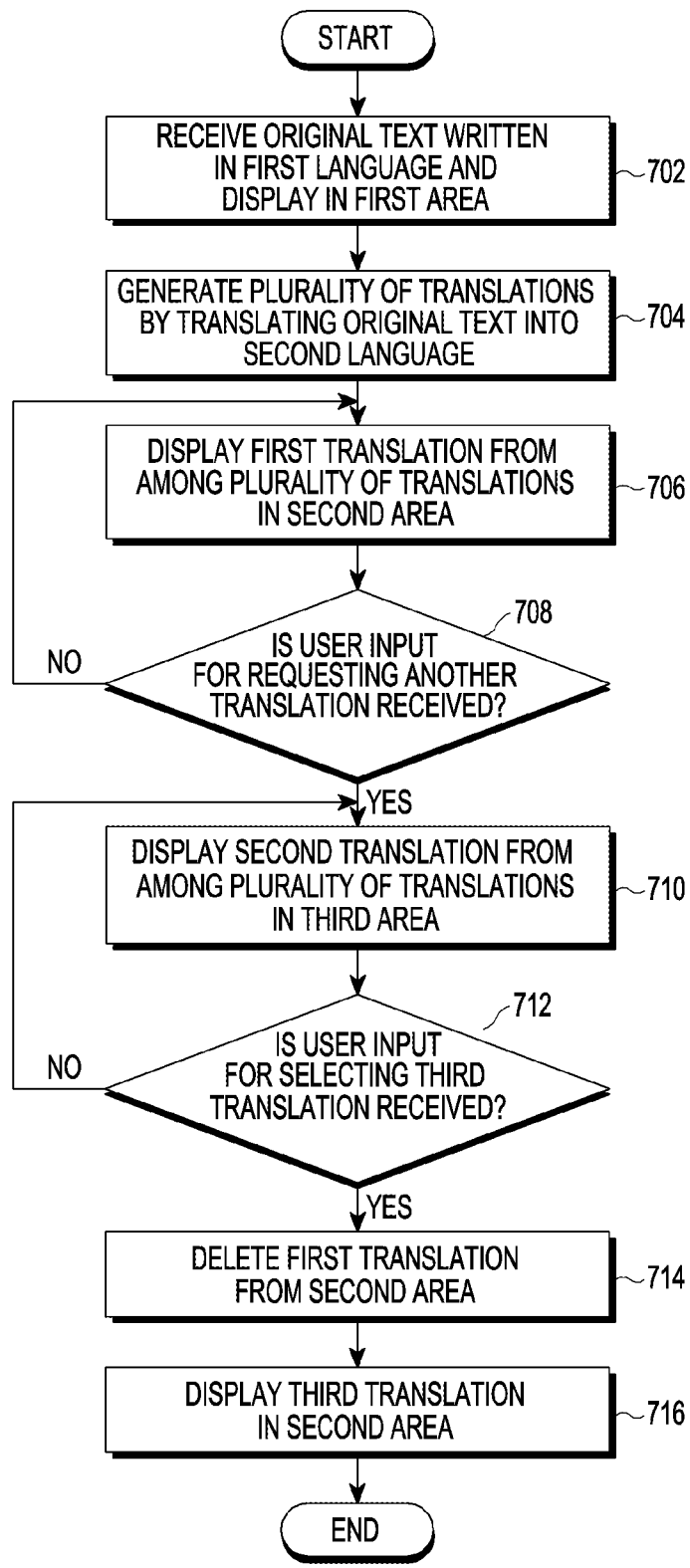
FIG. 7 is a diagram illustrating a method of providing a translation service by an electronic device according to various embodiments.

FIG. 7 is a diagram illustrating a method of providing a translation service by an electronic device according to various embodiments.

Referring to FIG. 7, in operation 702, the electronic device 101 may receive original text written in a first language from a user, and may display the same in a first area of the display 160. In operation 704, the processor 120 of the electronic device 101 may generate a plurality of translations which are created by translating the original text into a second language.

In operation 706, the electronic device 101 may display a first translation from among the plurality of translations in the second area of the display 160. The first translation displayed in operation 706 may be any one of the plurality of translations generated in operation 704.

The processor 120 may determine whether user input for requesting another translation that is different from the first translation is received in operation 708. When the result of the determination in operation 708 shows that no user input for requesting another translation is received (708: NO), the processor 120 may control the electronic device 101 to maintain the current state of displaying the first translation in a second area in operation 706.

When the result of the determination in operation 708 shows that user input for requesting another translation is received (708: YES), the electronic device 101 may display second translations from among the plurality of translations in a third area of the display 160 in operation 710. In operation 710, the second translations displayed in the third area may be at least one of the translations remaining after excluding the first translation from the plurality of translations generated in operation 704.

In operation 712, the processor 120 may determine whether user input for selecting a third translation from among the second translations displayed in the third area is received. When the result of the determination in operation 712 shows that user input for selecting the third translation is not received (712: NO), the processor 120 may control the electronic device 101 to maintain the current state of displaying the second translations in the third area in operation 710.

When the result of the determination in operation 712 shows that user input for selecting the third translation is received (712: YES), the processor 120 may remove the first translation from the second area of the display 160 in operation 714. In operation 716, the electronic device 101 may display the third translation in the second area.

Figure 8:
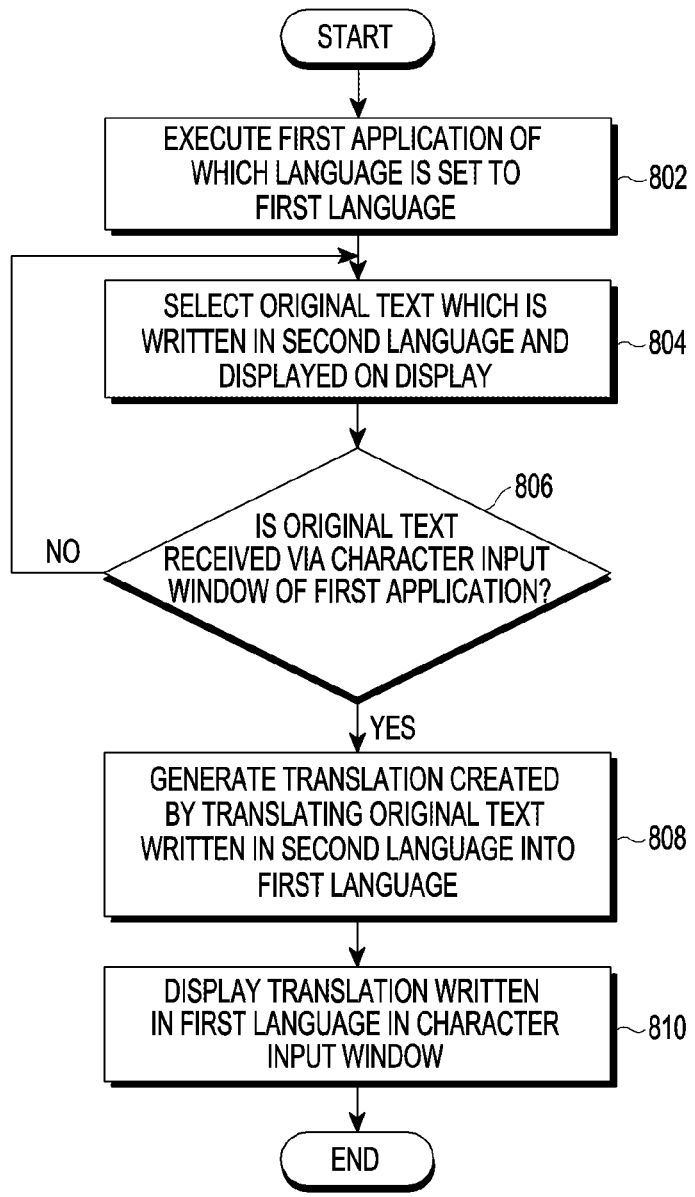
FIG. 8 is a diagram illustrating a method of providing a translation service by an electronic device according to various embodiments.

FIG. 8 is a diagram illustrating a method of providing a translation service by an electronic device according to various embodiments.

Referring to FIG. 8, in operation 802, the processor 120 of the electronic device 101 may execute a second application, the language of which is set to a first language. In operation 804, original text written in a second language, which is displayed on a display device (e.g., the display 160), may be selected by a user. Selecting the original text written in the second language may be performed by receiving a shortcut for copying text after at least a part of text displayed via an Internet browser is dragged.

In operation 806, the processor 120 of the electronic device 101 may determine whether the original text written in the second language is received via a character input window of a first application. When the result of the determination in operation 806 shows that the original text written in the second language is not received via the character input window (806: NO), the current state in which the original text written in the second language is selected may be maintained in operation 804.

When the result of the determination in operation 806 shows that the original text written in the second language is received via the character input window (806: YES), the processor 120 of the electronic device 101 may generate a translation by translating the original text written in the second language into the first language in operation 808. For example, when a shortcut for copying and pasting is received via the character input window, the processor 120 may translate the original text selected in operation 804 into the first language.

When the translation is generated, the electronic device 101 may display the translation written in the first language in operation 810.

A method for providing a translation service at an electronic device according to an embodiment of the present disclosure may include: receiving original text written in a first language; displaying the original text in a first area of a display of the electronic device; generating a translation created by translating the original text into a second language; extracting a keyword from the translation; displaying the translation in a second area of the display; and if the keyword is selected in the translation, displaying content related to the keyword in a third area of the display.

A method for providing a translation service at an electronic device according to another embodiment of the present disclosure may include: executing a first application of which a language is set to a first language; selecting original text, which is written in a second language and is displayed on a display of the electronic device; receiving the original text written in the second language via a character input window of a first application screen; and displaying, in the character input window, a translation created by translating the original text written in the second language into the first language.

Figure 9:
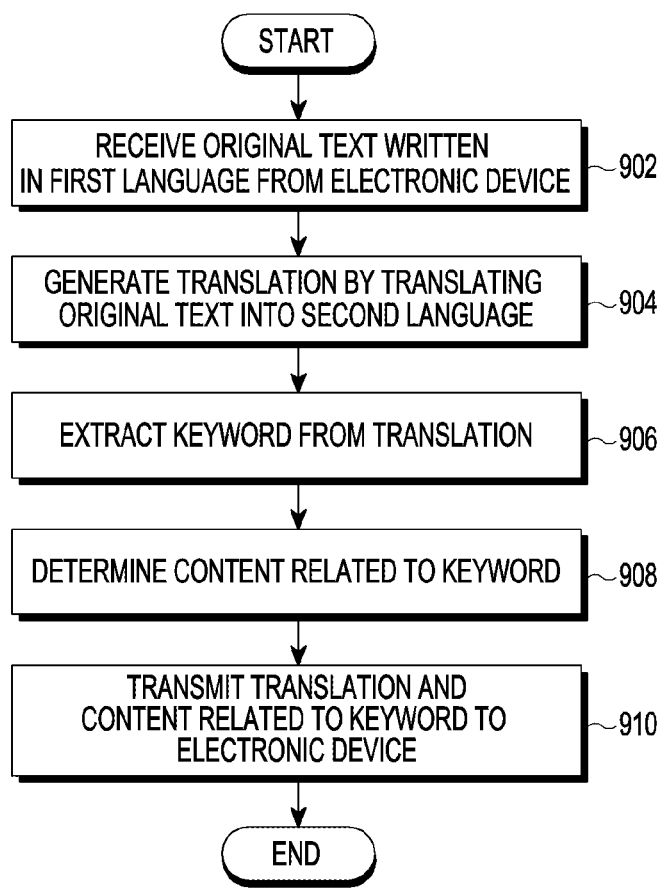
FIG. 9 is a diagram illustrating a method of providing a translation service by a server according to various embodiments.

FIG. 9 is a diagram illustrating a method of providing a translation service by a server according to various embodiments.

Referring to FIG. 9, the server 106 may receive original text written in a first language from the electronic device 101 that is connected to the server 106 for communication in operation 902. In operation 904, the translation engine 420 of the server 106 may generate a translation created by translating the original text into a second language. The translation engine 420 of server 106 may extract a keyword from the translation in operation 906. According to an embodiment, when the keyword is extracted in operation 906, the translation engine 420 of the server 106 may determine content related to the keyword in operation 908.

According to an embodiment, the translation engine 420 of the server 106 may receive the content from a service provision server related to the content via the communication interface 430. The communication interface 430 may request the service provision server to transmit content related to the keyword, and may receive the content related to the keyword. In operation 910, the server 106 may transmit the translation written in the second language and the content related to the keyword to the electronic device 101. The electronic device 101 may provide a translation service to a user by displaying, on the display 160, the translation and the content received from the server 106.

Figure 10:
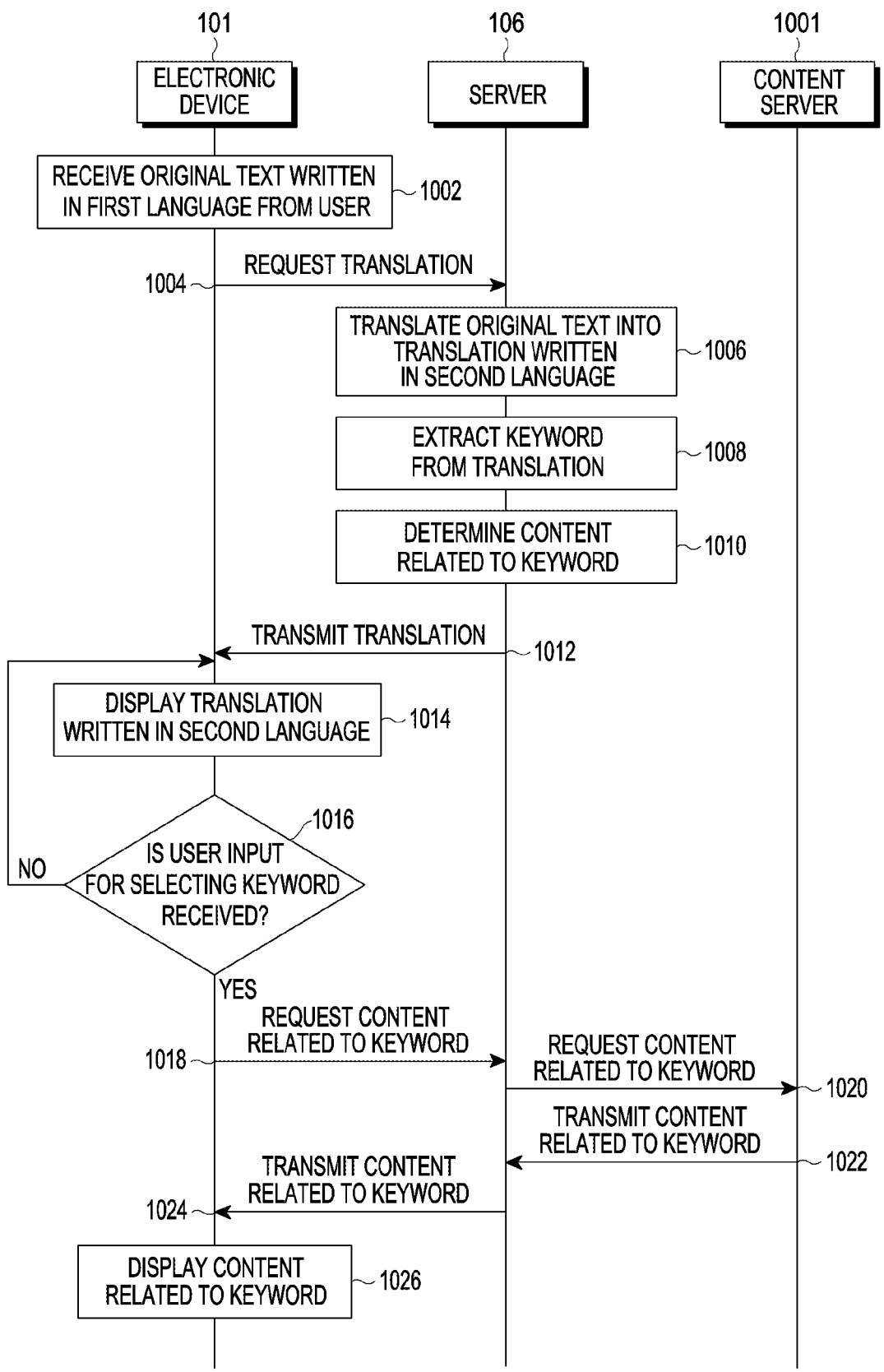
FIG. 10 is a diagram illustrating a method of providing a translation service between a server and an electronic device according to various embodiments.

FIG. 10 is a diagram illustrating a method of providing a translation service between a server and an electronic device according to various embodiments.

Referring to FIG. 10, the electronic device 101 may receive original text written in a first language from a user in operation 1002. The electronic device 101 may request a translation, which is created by translating the original text written in the first language into a second language, from the server 106, in operation 1004. The server 106 may translate the original text written in the first language into a translation written in the second language in operation 1006. The server 106 may extract a keyword from the translation in operation 1008 and may determine content related to the keyword in operation 1010.

In operation 1012, the server 106 may transmit the translation written in the second language to the electronic device 101. In operation 1014, the electronic device 101 may display the translation written in the second language on the display 160. The keyword in the translation displayed in operation 1014 may be displayed in a manner that distinguishes the same from words or idioms which are different from the keyword. In operation 1016, the electronic device 101 may determine whether user input for selecting the keyword in the translation is received.

When the result of the determination in operation 1016 shows that the user input for selecting the keyword is not received (1016: NO), the electronic device 101 may maintain the state of displaying the translation written in the second language as in operation 1014.

When the result of the determination in operation 1016 shows that user input for selecting the keyword is received (1016: YES), the electronic device 101 may request content related to the keyword from the server 106 in operation 1018. In operation 1020, the server 106 may request the content related to the keyword from a content server 1001 that stores the content. When the content related to the keyword is transmitted to the server 106 from the content server 1001 in operation 1022, the server 106 may transmit the content related to the keyword to the electronic device 101 in operation 1024. The electronic device 101 may display the content related to the keyword in operation 1026. Accordingly, a user of the electronic device 101 may conveniently receive both a translation service and various pieces of content related to the original text or the translation without performing a separate search.

Figure 11:
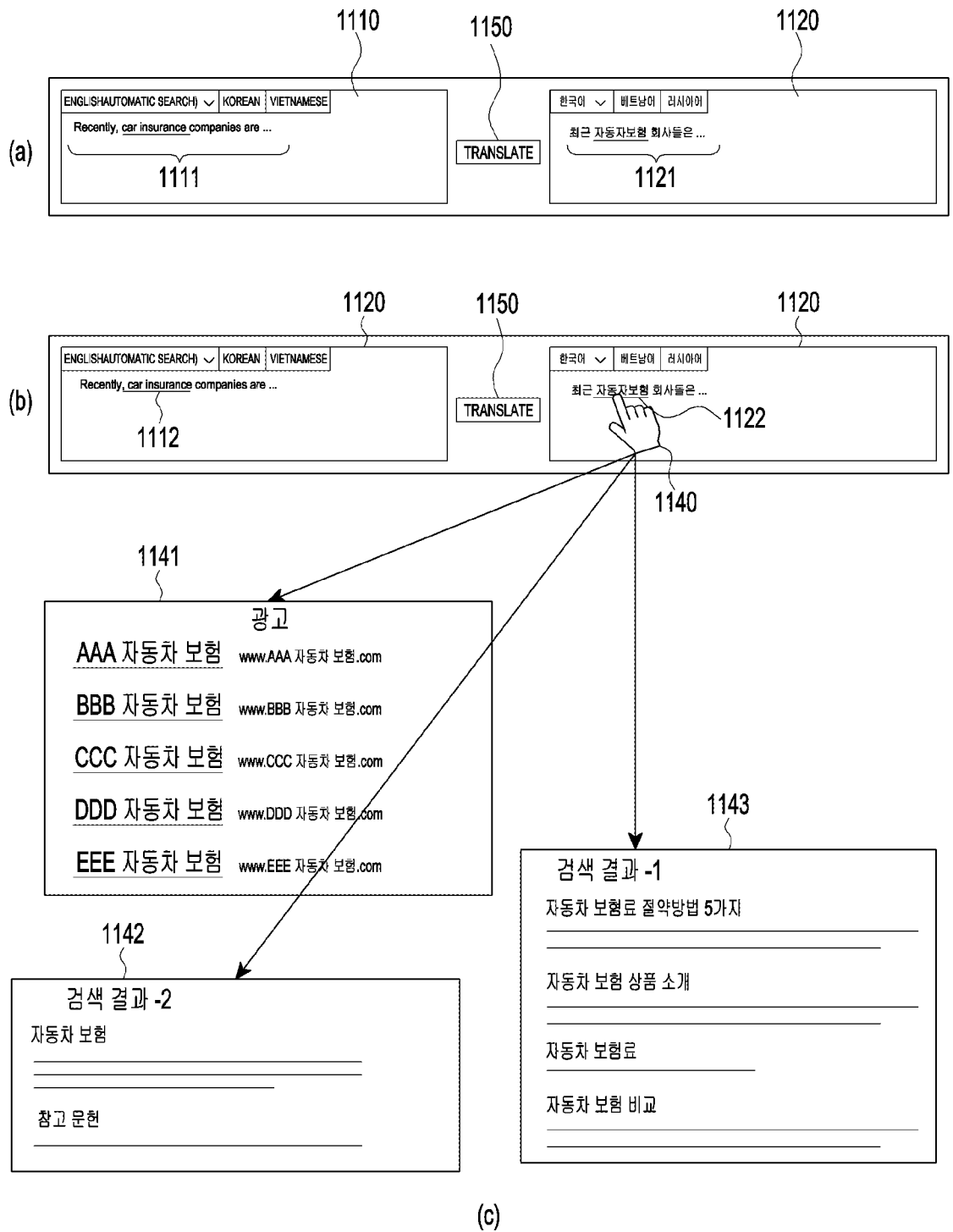
FIG. 11 is a diagram illustrating an example of providing a translation service by an electronic device or a server according to various embodiments.

FIG. 11 is a diagram illustrating an example of providing a translation service by an electronic device according to various embodiments. The diagrams (a) and (b) of FIG. 11 are diagrams illustrating an example of a translation created by translating original text 1111 written in a first language (e.g., English) into a second language (e.g., Korean), and the diagram (c) of FIG. 11 is a diagram illustrating several pieces of content related to a keyword 1122 included in a translation 1121.

Referring to the diagrams (a) and (b) of FIG. 11, the display 160 may display a first area 1110 for receiving the original text 1111 and a second area 1120 for displaying the translation 1121. In the diagrams (a) and (b) of FIG. 11, the original text 1111, saying "Recently, car insurance companies are . . . ", is displayed in the first area 1110, and the translation 1121, reading "최근 자동차보험 회사들은 . . . ", is displayed in the second area 1120. As described above, when the original text 1111 written in the first language is input into the first area 1110, the processor 120 may generate the translation 1121 created by translating the original text 1111 into the second language. According to an embodiment, the original text 1111 may be automatically translated. According to another embodiment, when an object 1150 (e.g., an icon) for requesting translation of the original text 1111 is selected, the processor 120 may generate the translation 1121 obtained by translating the original text 1111.

Referring to the diagram (b) of FIG. 11, the processor 120 may extract a keyword 1122 from the translation 1121. The processor 120 may control the display 160 such that text 1112 corresponding to the keyword in the original text 1111 is displayed in a manner that distinguishes the same from other text that is different from the keyword in the original text 1111. In the diagram (b) of FIG. 11, the keyword 1122 and the text 1112 corresponding to the keyword 1122 are underlined, whereby the keyword 1122 and the text 1112 corresponding to the keyword 1122 may be displayed such that they appear different from text other than the keyword 1122 and the text 1112 corresponding to the keyword 1122.

Referring to the diagram (b) of FIG. 11, user input 1140 for selecting the keyword 1122 may be input into the electronic device 101. When such user input 1140 for selecting the keyword 1122 is received, the processor 120 may control the display 160 such that one or more pieces of content related to the keyword 1122 are displayed in a separate area (e.g., a third area), which is different from the first area 1110 and the second area 1120. Referring to the diagrams (b) and (c) of FIG. 11, the processor 120 may determine a car-insurance-related advertisement, a search result associated with car insurance, and car-insurance-related news as content related to "car insurance" which is the keyword 1122. When the keyword 1122 is selected as illustrated in the diagram (b) of FIG. 11, the processor 120 may control the display 160 so as to display at least one of a third area 1141 including a car-insurance-related advertisement as the content corresponding to the keyword 1122, a third area 1142 including a search result associated with car insurance, and a third area 1143 displaying car-insurance-related news, as illustrated in the diagram (c) of FIG. 11.

Figure 12:
FIG. 12 is a diagram illustrating another example of providing a translation service by an electronic device or a server according to various embodiments.

FIG. 12 is a diagram illustrating another example of providing a translation service by an electronic device according to various embodiments. The diagrams (a), (b), and (c) of FIG. 12 are diagrams illustrating examples of a translation created by translating original text 1211 written in a first language (e.g., English) into a second language (e.g., Korean, Japanese, Russian).

Referring to the diagrams (a) to (c) of FIG. 12, the display 160 may display a first area 1210 for receiving the original text 1211 and a second area 1220 for displaying the translation on a screen. When the original text 1211 written in the first language is input into the first area 1210, the processor 120 may generate the translation 1221, 1222, and 1223 created by translating the original text 1211 into the second language. According to an embodiment, the original text 1211 may be automatically translated. According to another embodiment, when an object 1250 (e.g., an icon) for requesting translation of the original text 1211 is selected, the processor 120 may generate the translation 1221, 1222, and 1223 obtained by translating the original text 1211.

Referring to the diagrams (a) to (c) of FIG. 12, the original text 1211 written in the first language (English), reading "How about a drink after work?, is displayed in the first area 1210. The translation 1221, 1222, or 1223 may be displayed in the second area 1220, which changes depending on the second language. Referring to the diagrams (a) of FIG. 12, when the second language is Korean, "퇴근 후에 한 잔 할까?" may be displayed in the second area 1220, as the translation 1221 of the original text 1211. Referring to the diagram (b) of FIG. 12, when the second language is Japanese, "どのように仕事 の後のドリンクは?" may be displayed in the second area 1220, as the translation 1222 of the original text 1211. Referring to the diagram (c) of FIG. 12, when the second language is Russian, " Сегодня чашка кофе?" may be displayed in the second area 1220, as the translation 1223 of the original text 1211.

According to an embodiment, the processor 120 may extract a keyword 1231, 1232, and 1233 from the translation 1221 to 1223. Referring to the diagrams (a) to (c) of FIG. 12, the keyword 1231 to 1233 in the translation 1221 to 1223 may be underlined, whereby they are displayed in a manner that distinguishes them from text which is different from the keyword 1231 to 1233.

According to an embodiment, a user input of selecting the keyword 1231 to 1233 may be input into the electronic device 101. When the user input for selecting the keyword 1231 to 1233 is received, the processor 120 may control the display 160 such that one or more pieces of content related to the keyword 1231 to 1233 are displayed in a separate area, for example, a third area, which is different from the first area 1210 and the second area 1220. Referring to the diagrams (a) to (c) of FIG. 12, the processor 120 may determine images 1241, 1242, and 1243 as content related to each keyword 1231, 1232, and 1233, that is, " 한 잔", "ドリンク", and " чашка ". Referring to the diagram (a) of FIG. 12, when the second language is Korean, the keyword 1231 may be " 한 잔" which is Korean. According to an embodiment, the processor 120 may determine content related to the nation that uses the second language as content related to the keyword 1231. Referring to the diagram (a) of FIG. 12, since the second language is Korean, the image 1241 of Korean liquor may be displayed in an area different from the first area 1210 and the second area 1220, for example, a third area, as content related to " 한 잔 " which is the keyword 1231.

Referring to the diagram (b) of FIG. 12, when the second language is Japanese, the keyword 1232 may be "ドリンク", which is Japanese. Referring to FIG. 12, since the second language is Japanese, the image 1242 of Japanese liquor may be displayed in an area different from the first area 1210 and the second area 1220, for example, a third area, as content related to "ドリンク", which is the keyword 1232. Referring to the diagram (c) of FIG. 12, when the second language is Russian, the keyword 1233 may be " чашка ", which is Russian. Referring to FIG. 12, when the second language is Russian, the image 1243 of Russian liquor may be displayed in the third area, as content related to " чашка ", which is the keyword 1233.

Figure 13:
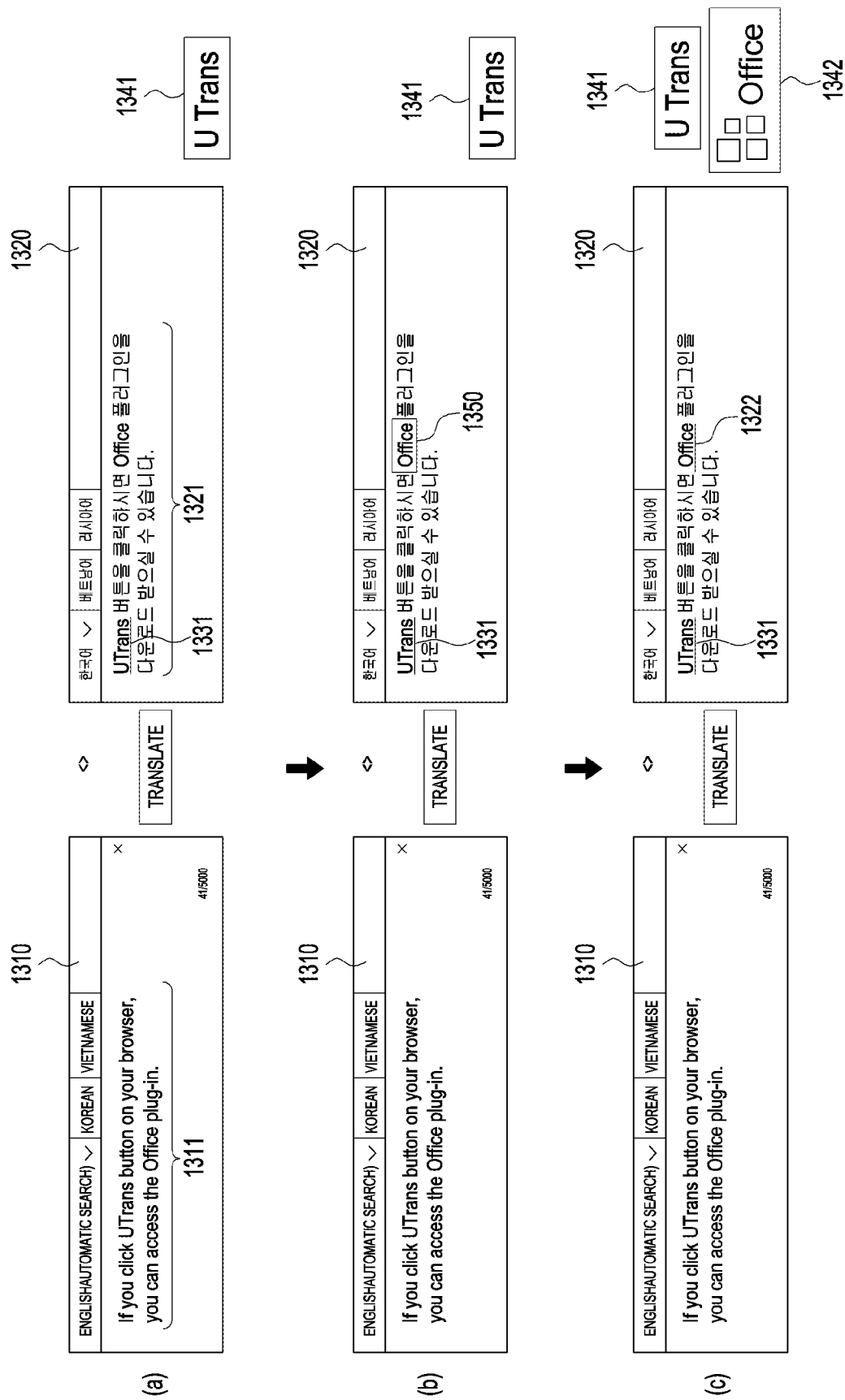
FIG. 13 is a diagram illustrating another example of providing a translation service by an electronic device or a server according to various embodiments.

FIG. 13 is a diagram illustrating another example of providing a translation service by an electronic device according to various embodiments. The diagrams (a), (b), and (c) of FIG. 13 are diagrams illustrating an example of a translation 1321 created by translating original text 1311 written in a first language (e.g., English) into a second language (e.g., Korean).

Referring to the diagrams (a) to (c) of FIG. 13, the display 160 may display a first area 1310 for receiving the original text 1311 and a second area 1320 for displaying the translation 1321 on a screen. The original text 1311, saying "If you click the UTrans button on your browser, you can access the Office plug-in", is displayed in the first area 1310 of diagrams (a) to (c) of FIG. 13, and the translation 1321, reading "UTrans 버튼을 클릭하시면 Office 플러그인을 다운로드 받으실 수 있습니다," is displayed in the second area 1320. As described above, when the original text 1311 written in a first language (e.g., English) is input into the first area 1310, the processor 120 may generate the translation 1321 created by translating the original text 1311 into the second language (e.g., Korean). According to an embodiment, the original text 1311 may be automatically translated. According to another embodiment, when an object for requesting translation of the original text 1311 is selected, the processor 120 may generate the translation 1321 obtained by translating the original text 1311.

According to an embodiment, the processor 120 may extract a keyword 1331 from the translations 1321. In diagrams (a) to (c) of FIG. 13, the keyword 1331 is underlined, whereby the keyword 1331 is displayed in a manner that distinguishes the same from text that is different from the keyword 1331.

According to an embodiment, the processor 120 may control the display 160 so as to display content 1341 related to the keyword 1331 included in the translation 1321. Referring to the diagram (b) of FIG. 13, the keyword 1331 in the translation 1321 is the word "UTrans", and the display 160 of the electronic device 101 may display an image related to "UTrans" as the content 1341 related to the keyword 1331.

According to an embodiment, the electronic device 101 may receive user's selection on text which is different from the extracted keyword 1331 in the translation 1321. When user input 1350 for selecting the text different from the keyword 1331 is input, the processor 120 may determine the text selected by the user input 1350 as a keyword. Also, the processor 120 may determine content related to the keyword selected by the user input 1350. In the diagram (b) of FIG. 13, a word "Office" is selected by a drag input 1350. Referring to the diagram (c) of FIG. 13, the processor 120 may determine the word "Office" as a keyword 1332, and may control the display 160 so as to display the keyword to be different from the text different from the keywords 1331 and 1332 by underlining the word "Office". Also, the processor 120 may control the display 160 so as to display content 1342 related to "Office", which is the keyword 1332.

Figure 14:
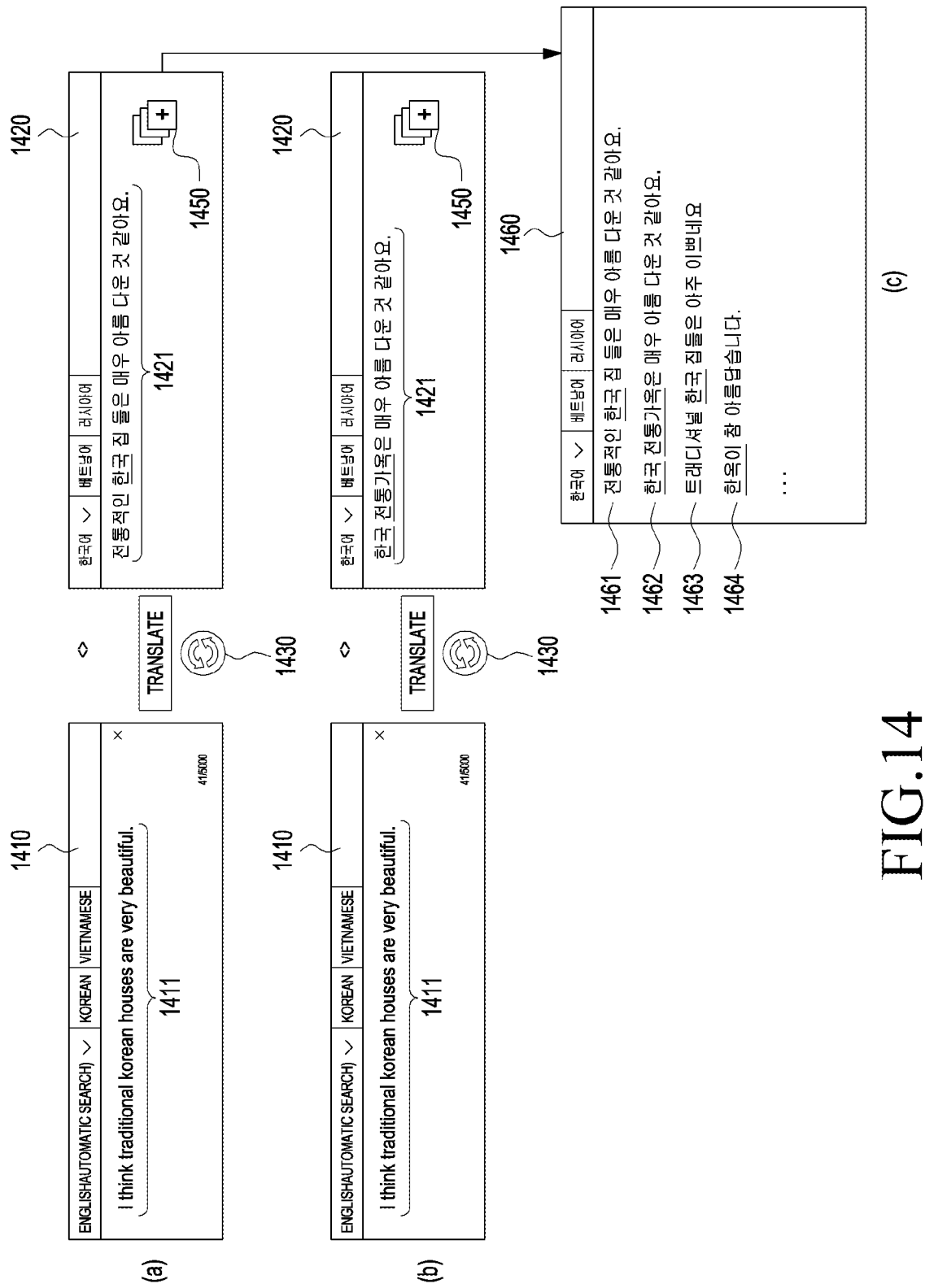
FIG. 14 is a diagram illustrating another example of providing a translation service by an electronic device or a server according to various embodiments.

FIG. 14 is a diagram illustrating another example of providing a translation service by an electronic device according to various embodiments. The diagrams (a) and (b) of FIG. 14 are diagrams illustrating an example of a translation 1421 created by translating original text 1411 written in a first language (e.g., English) into a second language (e.g., Korean), and the diagram (c) of FIG. 14 is a diagram illustrating a plurality of translations 1461 to 1464 obtained by translating the original text 1411 into the second language.

Referring to diagrams (a) and (b) of FIG. 14, the display 160 may display a first area 1410 for receiving the original text 1411 and a second area 1420 for displaying the translation 1421 on a screen. The original text 1411, saying "I think traditional Korean houses are very beautiful." is displayed in the first area 1410 of diagrams (a) and (b) of FIG. 14, and the translation 1421, reading " 전통적인 한국 집들은 매우 아름다운 것 같아요 " is displayed in the second area 1420. As described above, when the original text 1410 written in the first language (e.g., English) is input into the first area 1411, the processor 120 may generate the translation 1411 created by translating the original text 1421 into the second language (e.g., Korean). According to an embodiment, the original text 1411 written in the first language may be automatically translated. According to another embodiment, when an object 1430 (e.g., an icon) for requesting translation of the original text 1411 is selected, the processor 120 may generate a translation by translating the original text 1411 into the second language in response to the selection.

According to an embodiment, the processor 120 may generate a plurality of translations of the original text 1411. A word or an idiom written in the first language may have a meaning that is the same as, or similar to, one or more words or idioms written in the second language. One sentence includes one or more words, and thus the processor 120 may generate a plurality of translations by utilizing (or combining) words or idioms written in the second language, which have meanings the same as, or similar to, words or idioms included in the sentence written in the first language. Referring to the diagram (a) of FIG. 14, the processor 120 may control the display 160 so as to preferentially display, in the second area 1420, the representative translation 1421 from among the plurality of translations. The processor 120 may display, in the second area 1420, the representative translation 1421 and an object 1450 for displaying translations 1461, 1462, 1463, and 1464 different from the representative translation 1421. When user input for selecting the object 1450 is received from the user, the processor 120 may display the translations 1461, 1462, 1463, and 1464 excluding the representative translation 1421 in a third area 1460. Referring to FIG. 14C, the processor 120 displays translations 1461, 1462, 1463, and 1464 excluding the representative translation 1421 in the third area 1460 on the display 160, when the object 1450 is selected by a user. When one of the translations 1461 to 1464 displayed in the third area 1460 is selected by the user, the processor 120 may remove the representative translation 1421 from the second area 1420, and may display the selected translation as a translation of the original text 1411. Referring to FIG. 14C, the first translation 1461, the second translation 1462, the third translation 1463, and the fourth translation 1464 may be displayed in the third area 1460, as translations of the original text 1411. In the diagram (b) of FIG. 14, the user may assume that a user selects the second translation 1462, which is to replace the representative translation 1421. Referring to the diagram (b) of FIG. 14, the processor 120 may remove the translation 1421 from the second area 1420, and may display the second translation 1462 in the second area 1420, as a new representative translation 1422.

Figure 15:
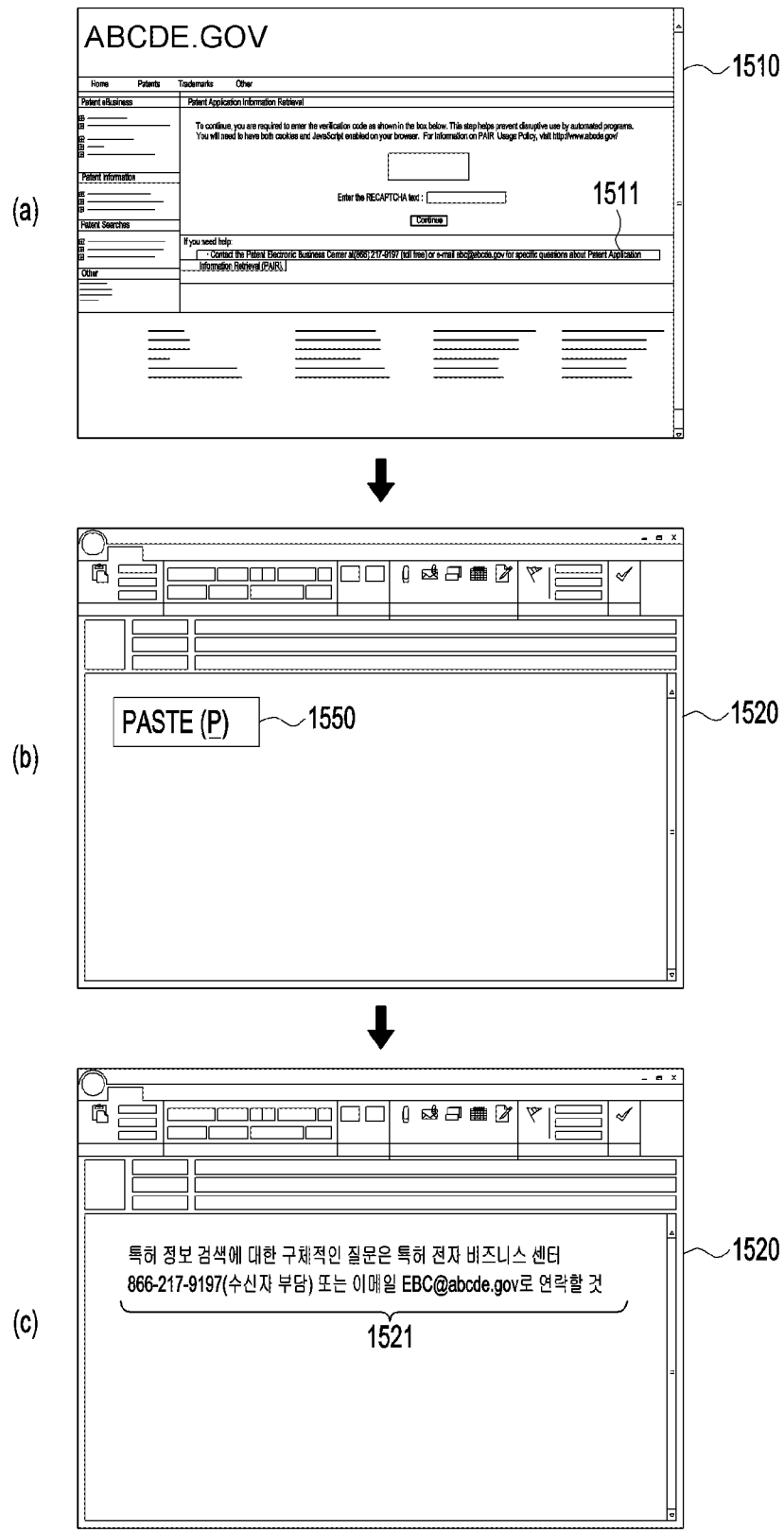
FIG. 15 is a diagram illustrating an example of providing a translation service by an electronic device according to various embodiments.

FIG. 15 is a diagram illustrating another example of providing a translation service by an electronic device according to various embodiments. It is assumed that the diagram (a) of FIG. 15 is a first application execution screen 1510, and that the diagrams (b) and (c) of FIG. 15 correspond to a second application execution screen 1520.

Referring to the diagram (a) of FIG. 15, the processor 120 may receive a user input for selecting text 1511 written in a first language (e.g., English) from among objects included in the first application execution screen 1510. It is assumed that the user input in the diagram (a) of FIG. 15 is input into the electronic device 101 by dragging the text 1511. According to an embodiment, the electronic device 101 may receive input of a shortcut for copying the text 1511 after the text 1511 is dragged, as illustrated in the diagram (a) of FIG. 15.

Referring to the diagram (b) of FIG. 15, the processor 120 may receive user input 1550 for inputting a translation of the text 1511 to the second application execution screen 1520. For example, the user may input a shortcut corresponding to "paste (P)" to the electronic device 101, whereby the user input 1550 for displaying a translation created by translating the text 1511 into a second language (e.g., Korean) may be input to the execution screen 1520.

Referring to the diagram (c) of FIG. 15, the translation 1521 written in the second language may be displayed on the second application execution screen 1520 in response to the user input 1550. In the diagram (a) of FIG. 15, when it is assumed that the original text 1511 selected by the user is "Contact the Patent Electronic Business Center at (866) 217-9197 (toll free) or e-mail EBC@uspto.gov for specific questions about Patent Application Information Retrieval (PAIR)", the processor 120 in the diagram (c) of FIG. 15 may output a translation, reading "특허 정보 검색에 대한 구체적인 질문은 특허 전자 비즈니스 센터(866-217-9197 (수신자 부담) 또는 이메일 EBC@uspto.gov로 연락할 것" via the execution screen 1520.

According to an embodiment, the processor 120 may detect the language of text displayed on the display 160 or the language used by each executed application. For example, the processor 120 may detect English as the language used in the first application, from the first application execution screen 1510. The processor 120 may detect Korean as the language used in the second application, from the second application execution screen 1520. By detecting the language used in each application, the processor 120 may translate the original text 1511 into the language used in each application. For example, it is assumed that the text included in the first application execution screen 1510, which is text written in English (original text), is selected. Also, it is assumed that the text is input into the second application. Since Korean is used in the second application, the processor 120 may translate the text (original text) into the language used in the second application, that is, Korean, and may input the translation to the second application. As another example, when Japanese is used in the second application, the processor 120 may translate the text (original text) into Japanese, and may input the same into the second application.

The term "module" used in the present disclosure may refer to, for example, a unit including one or more combinations of hardware, software, and firmware. The "module" may be interchangeable with a term, such as a unit, a logic, a logical block, a component, or a circuit. The "module" may be the smallest unit of an integrated component or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may, for example, be the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added. Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

The invention claimed is:

1. A method for providing a translation service at an electronic device, the method comprising:
receiving original text written in a first language;
displaying the original text in a first area of a display of the electronic device;
obtaining a translation created by translating the original text into a second language;
obtaining a first keyword of the second language based on the translation and a second keyword of the second language based on a user input, from the translation;
displaying the translation including the first keyword and the second keyword in a second area of the display in a manner that the first keyword and the second keyword are distinguished from other words in the translation;
obtaining first content of the second language related to the first keyword and second content of the second language related to the second keyword; and
displaying the obtained first content and the obtained second content in a third area of the display.

2. The method of claim 1, wherein the first content and the second content comprise
at least one of a related advertisement, an image, and related search information.

3. The method of claim 1, wherein obtaining the translation created by translating the original text into the second language comprises:
generating a plurality of different translations.

4. The method of claim 3, further comprising:
if a request for displaying other translations excluding the translation displayed in the second area is received, displaying, in a fourth area, translations excluding the translation displayed in the second area, from among the plurality of different translations.

5. The method of claim 4, further comprising:
if one of the translations displayed in the fourth area is selected, removing the translation from the second area; and
displaying, in the second area, the selected translation as a translation obtained by translating the original text into the second language.

6. An electronic device for providing a translation service, the electronic device comprising:
an input interface;
a display; and
a processor configured to:
receive text written in a first language,
display the text in a first area of the display of the electronic device,
obtain a translation by translating the text into a second language,
obtain a first keyword of the second language based on the translation and a second keyword of the second language based on a user input using the input interface, from the translation,
control the display to display the translation including the first keyword and the second keyword in a second area such that the first keyword and the second keyword are distinguished from other words in the translation,
obtain first content of the second language related to the first keyword and second content of the second language related to the second keyword, and
control the display to display the first content and the second content in a third area.

7. The electronic device of claim 6, wherein the first content and the second content comprise
at least one of a related advertisement, an image, or related search.

8. The electronic device of claim 6, wherein the processor is further configured to obtain a plurality of different translations.

9. The electronic device of claim 8, wherein the processor is further configured to:
if a request for displaying other translations excluding the translation displayed in the second area is received via the input interface, control the display so as to display, in a fourth area, translations excluding the translation displayed in the second area from among the plurality of different translations.

10. The electronic device of claim 9, wherein the processor is further configured to:
if one of translations displayed in the fourth area is selected, remove the translation from the second area, and
control the display so as to display the selected translation in the second area as a translation created by translating the text into the second language.

* * * * *